United States Patent [19]

Mersereau et al.

[11] Patent Number: 5,370,768
[45] Date of Patent: Dec. 6, 1994

[54] METHOD FOR MAKING MICROSTRUCTURES

[75] Inventors: Keith O. Mersereau, Northampton, Pa.; Casimir R. Nijander, Lawrenceville; Wesley P. Townsend, Princeton, both of N.J.

[73] Assignee: AT&T Corp., Murray Hill, N.J.

[21] Appl. No.: 135,644

[22] Filed: Oct. 14, 1993

[51] Int. Cl.5 .................. B44C 1/22; H01L 21/306; C03C 15/00; C03C 25/06
[52] U.S. Cl. .................. 156/643; 156/651; 156/659.1; 156/663; 359/365; 359/619; 430/321; 430/323; 430/330
[58] Field of Search .............. 156/643, 651, 654, 657, 156/659.1, 661.1, 663, 662; 359/365, 619; 430/321, 323, 330

[56] References Cited

U.S. PATENT DOCUMENTS

| | | | |
|---|---|---|---|
| 4,530,736 | 7/1985 | Mutter | 156/643 |
| 4,813,762 | 3/1989 | Leger et al. | 350/162.16 |
| 5,079,130 | 1/1992 | Derkits, Jr. | 430/321 |
| 5,286,338 | 2/1994 | Feldblum et al. | 156/643 |

OTHER PUBLICATIONS

"A Process for Monolithic Fabrication of Microlenses on Integrated Circuits," by Z. D. Popovic et al., SPIE, vol. 989 Miniature Optics and Lasers (1988), pp. 23–25.
"Ion–Beam Etching of InP and Its Applications to the Fabrication of High Radiance InGasAsP/InP Light Emitting Diodes," by O. Wada, *Journal of Electrochemical Society: Solid–State Science and Technology,* Oct. 1984, vol. 131, No. 10, pp. 2373–2380.

*Primary Examiner*—William Powell
*Attorney, Agent, or Firm*—Roderick B. Anderson

[57] ABSTRACT

Prior to the production of microlenses (29) by the reactive ion etch technique, a pattern of notches (25) is formed in a second surface of a substrate (11) opposite a first surface on which the microlenses (29) are to be formed. Reactive ion etching of the first surface to produce the microlenses is sufficiently deep to reach the pattern of notches, thereby to separate the substrate. The array of notches may define, for example, an array of first areas (26) on the second surface, each area being surrounded by a notch. Photoresist elements (28) are then each located on an area of the first surface corresponding to a first area of the second surface, so that the separation separates the substrate into a plurality of segments (26) each containing only one of the microlenses (29). The notches can be made such that each of the segments (26) is cylindrical so that each of the microlenses formed from the substrate has a circular outer periphery.

12 Claims, 3 Drawing Sheets

METHOD FOR MAKING MICROSTRUCTURES

TECHNICAL FIELD

This invention relates to methods for making for making microstructures and, more particularly, to methods for making microlenses by reactive ion etching.

BACKGROUND OF THE INVENTION

The copending application of A. Y. Feldblum et al., Ser. No. 08/024,035, filed Mar. 1, 1993, now U.S. Pat. No. 5,286,338, Feb. 15, 1994 and the patent of Derkits, U.S. Pat. No. 5,079,130, granted Jan. 7, 1992, both hereby incorporated herein by reference, describe a method for making microlens arrays comprising the steps of forming an array of photoresist elements on a silica substrate, melting the elements to cause them to have curved or dome-shaped surfaces, and thereafter solidifying the elements. The photoresist elements and the substrate are then subjected to reactive ion etching, that is, etching by a reactive gas in which the reaction is enhanced by applied radio frequency power. The photoresist elements cause differential etching of the substrate such that, after all of the photoresist has been etched away, the dome shapes of the original photoresist elements are replicated in the silica substrate.

The application points out that the technique is useful for making arrays of microlenses which can be used as a unit, or from which individual or discrete lenses can be selected for use. If discrete lenses are to be made, the array must be cut by any of a variety of methods to separate the individual lenses. Mechanical sawing of the array may be impractical because it may produce microcracks in the lenses that could interfere with their function. Also, it is sometimes desirable, for optimizing optical characteristics, to produce individual microlenses each having a circular outer periphery, and making the required circular cuts can be difficult. The Feldblum et al. technique for making microlenses would be much more practical for making discrete microlenses if methods for separating an array into individual elements, especially circular elements, could be simplified.

SUMMARY OF THE INVENTION

In accordance with one embodiment of the invention, prior to the production of microlenses by the reactive ion etch technique described above, an array of notches is formed in a second surface of the substrate opposite the first surface on which the microlenses are to be formed. The reactive ion etching of the first surface is sufficiently deep to reach the array of notches, thereby to separate the substrate. The array of notches may define, for example, an array of first areas on the second surface, each area being surrounded by a notch. The photoresist elements are then each located on an area of the first surface corresponding to a first area of the second surface so that separation by the ion etch step separates the substrate into a plurality of segments each containing only one of said lens elements. The notches can be made such that each of the segments is cylindrical so that each of the lenses formed from the substrate has a circular outer periphery.

These and other objects, features and benefits of the invention will be better understood from a consideration of the following detailed description taken in conjunction with the accompanying drawing.

DETAILED DESCRIPTION

Figure 1:
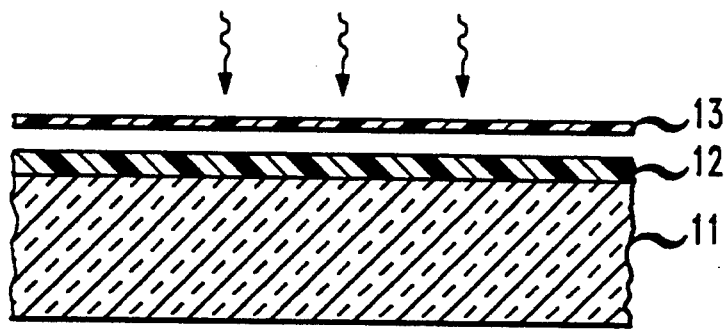
FIGS. 1-6 are schematic sectional views showing successive operations on a substrate to form a plurality of microlens elements in accordance with an illustrative embodiment of the invention.
Figure 2:
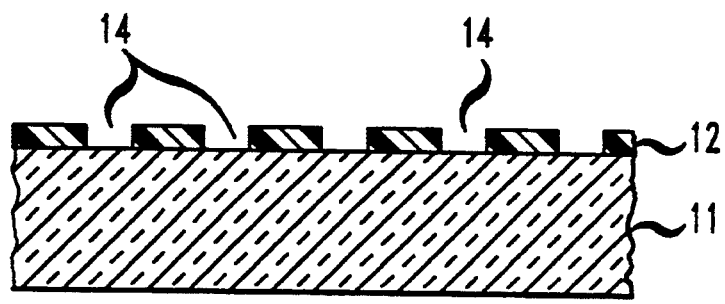

The drawings are intended to be schematic, and in some cases dimensions are distorted in the interest of clarity of exposition. Referring to FIG. 1, a silica substrate 11 is coated on one surface with a layer 12 of photoresist material which is overlaid by a photomask 13. The photoresist layer 12 is selectively exposed to actinic light in accordance with a pattern on the photomask 13. Referring to FIG. 2, development of the photoresist layer 12 after selective exposure defines a pattern of openings 14 corresponding to the pattern on the photomask 13.

Figure 7:
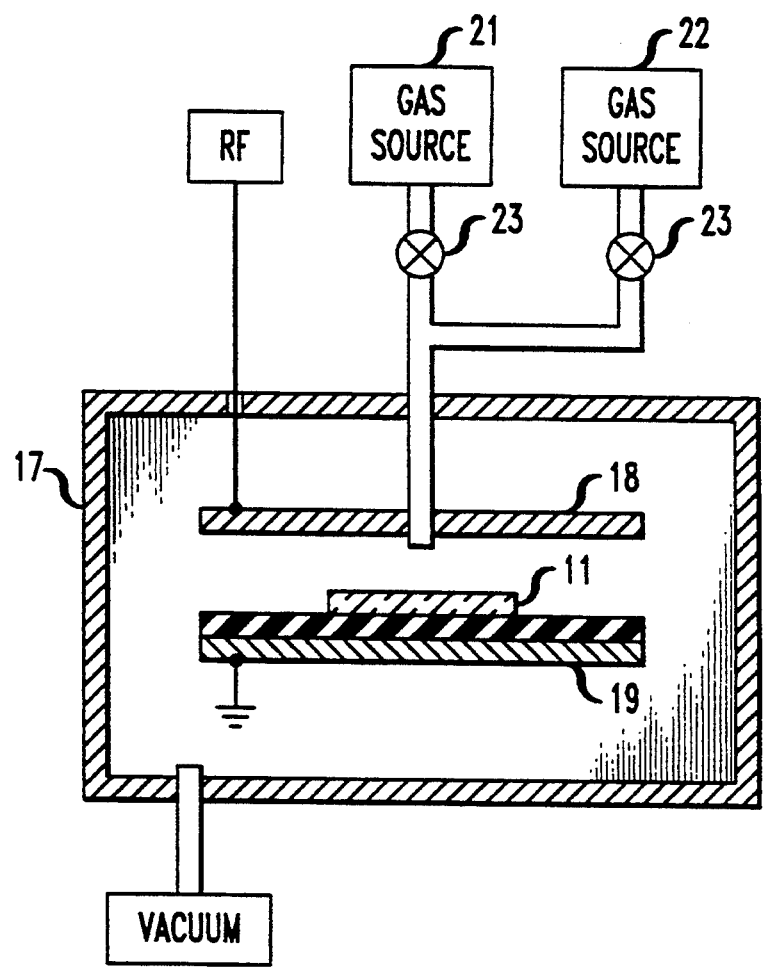
FIG. 7 is a schematic diagram of reactive ion etch apparatus in accordance with an illustrative embodiment of the invention.
Figure 9:
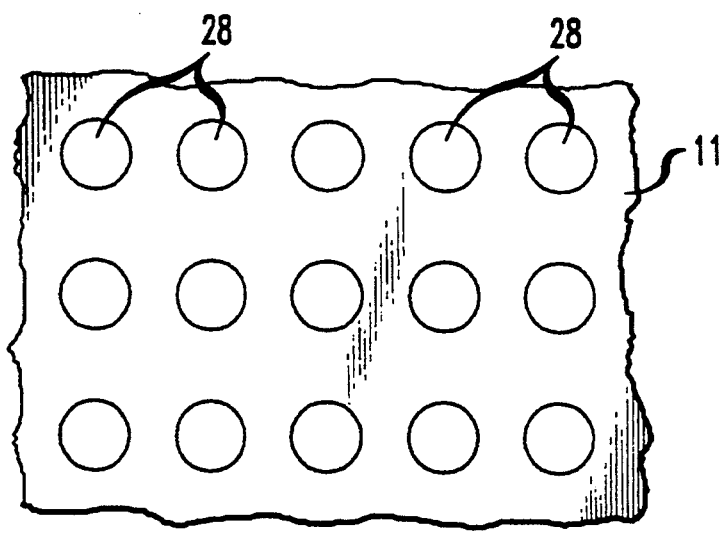
FIG. 9 is a view taken along lines 9—9 of FIG. 5.

Next, the substrate 11 of FIG. 2 is etched where exposed by the openings 14. Referring to FIG. 7, such etching may be a reactive ion etch done, as is known in the art, in a reactor 17 having opposite electrodes 18 and 19. A gas such as a mixture of $CHF_3$ and oxygen, supplied by sources 21 and 22 and controlled by valve devices 23, is flowed into the reactor to provide a small gas pressure within the reactor, which is otherwise evacuated. The substrate 11 to be etched is placed on an insulative member over the electrode 19, with the mask layer 12 up, and subjected to the gas atmosphere, with rf power supplied, as shown, to electrode 18. The photoresist layer 12 of FIG. 2 is resistant to the reactive ion etch so that etching of substrate 11 only occurs at regions corresponding to the openings 14 of FIG. 2.

Figure 3:
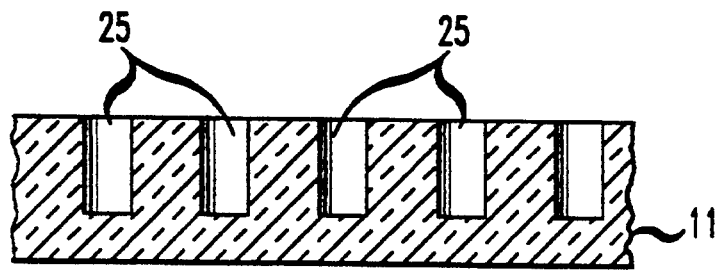
Figure 4:
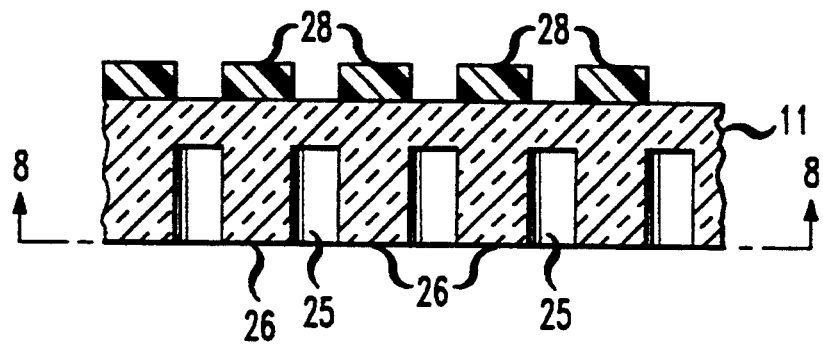
Figure 8:
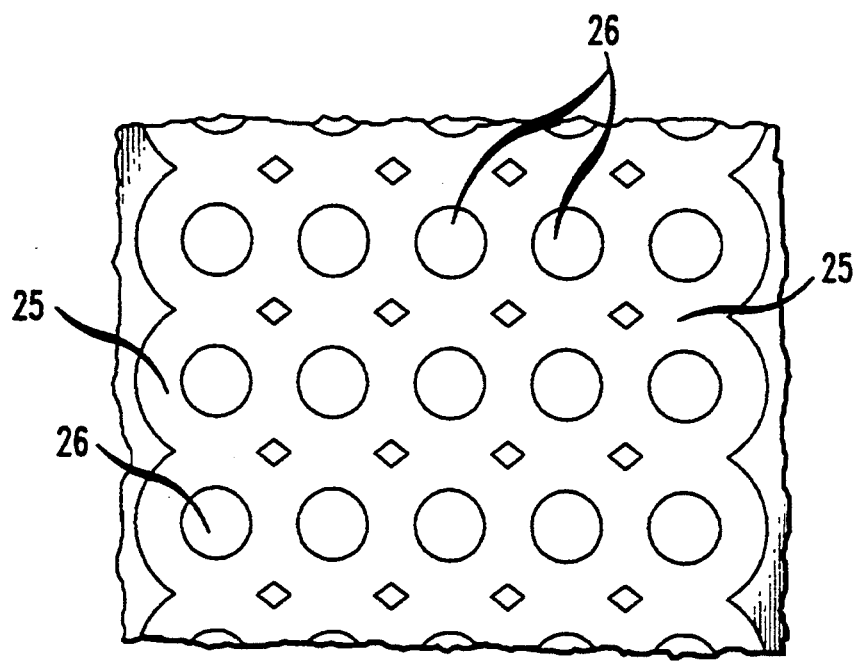
FIG. 8 is a view taken along lines 8—8 of FIG. 4.

The etching results in the formation of a pattern of notches 25 shown in FIG. 3, and after the etching the remaining photoresist layer 12 of FIG. 2 is removed. Referring to FIGS. 4 and 8, the pattern of notches 25 may have the shape of interconnected annuli which define an array of cylindrical segments 26. A layer of photoresist material is then made on the surface of substrate 11 opposite the notches 25; the layer is masked and etched to define an array of photoresist elements 28, as shown in FIG. 4, each of which covers an area corresponding to one of the cylindrical segments 26. As described in the Feldblum et al. patent, the elements 28 are cylindrical in shape and are intended eventually to define one microlens of an array. The mask used to make elements 28 is registered with the pattern of notches 25 such that each cylindrical element 28 is substantially coaxial with a corresponding cylindrical segment 26.

Figure 5:
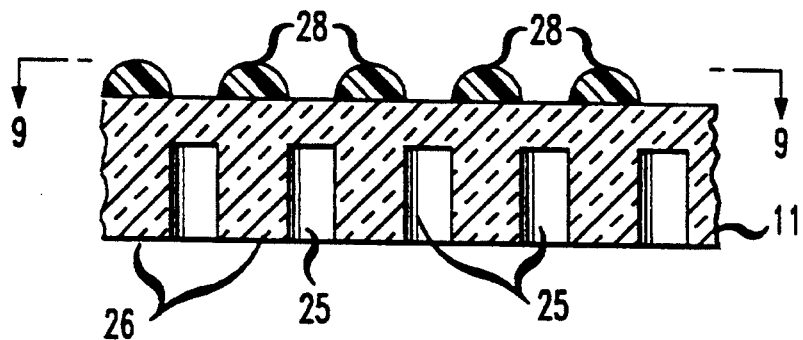

Referring to FIG. 5, the structure of FIG. 4 is heated sufficiently to cause each element 28 to assume a curved or dome shape, as shown. That is, heating melts the elements and surface tension causes the upper surface of fluid photoresist element 28 to form a curved shape. The photoresist elements 28 are thereafter cooled and hardened to stabilize them in that configuration.

As is described in the Feldblum et al. patent, the configurations of elements 28 are replicated in the silica substrate 11 by reactive ion etching of the surface containing the photoresist elements 28 in the reactor of FIG. 7. In this case, the substrate 11 is located in the reactor with the surface containing the elements 28 being up. The reactive ion etch of this surface differentially etches the substrate 11; that is, the portion of the substrate not covered by any photoresist starts to etch immediately, with other portions etching only after the photoresist directly above it has been removed by etching. This process continues until all of the photoresist 28 has been etched away, leaving the original dome shapes of the photoresist etched in the substrate.

Figure 6:
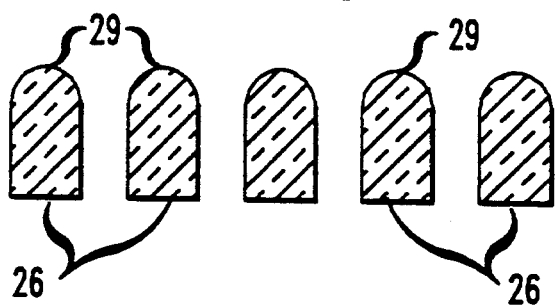

As shown in FIG. 6, the differential etching of substrate 11 leaves curved lens portions 29 on the upper surface of each of the segments 26. As described in the Feldblum et al. patent, appropriate changes in the gas atmosphere during etching can be used to reduce or eliminate lens aberrations. In accordance with this embodiment, the notches 25 of FIG. 5 have been made sufficiently deep that etching to form the lens elements 29 etches sufficiently into the substrate 11 to reach the notches 25 of FIG. 5. Consequently, the formation of the lenses automatically separates the microlenses 29.

Because of the cylindrical shape of the segments 26, the etching leaves finished microlenses having a circular outer periphery which is suitable for individual use, for example, in photonic packages. For example, each microlens 29 shown in FIG. 6 may be used for coupling light to or from an optical fiber, a laser, or a photodetector. The types of photoresist 28 that may be used for this process, and the parameters of the reactive ion etch reactor of FIG. 8 for obtaining desirable lenses 29, have been fully explained in the Feldblum et al. patent and the Derkits patent and will not be repeated. As is known, $CF_4$ and $CHF_3$, alone or in combination with $O_2$, can be used for etching $SiO_2$, and $SiCL_4$, $BCl_3$, $Cl_2$, and $CHCl_2F$, alone or in combination with $O_2$ or $SF_6$, may be used for etching silicon substrates.

The conditions for forming notches 25 are extremely well known in the reactive ion etch art and will therefore not be discussed in detail. One of the recognized attributes of reactive ion etching is that it etches anisotropically, that is, it can yield fairly perpendicular side walls for the notches 25, as shown in FIG. 3. However, other etching methods could alternatively be used. From FIG. 8, one can see that, in the embodiment shown, the notches 25 are interconnected and so one could argue that only a single notch is formed. Thus, the term "pattern of notches" as used herein is intended to include interconnected notches as well as unconnected notches.

The illustrative embodiment shows the etching of the upper surface of FIG. 5 to extend the entire distance to notches 25; the substrate 11 could alternatively be designed such that a thin web remains, which could thereafter be easily etched or broken to separate out the individual lenses. The invention presupposes that the pattern of notches on one side of the substrate is properly aligned with the photoresist elements 28 on the other side of the substrate, as shown in FIGS. 4 and 5. One method of accurately aligning photomasks on opposite sides of a substrate is described in the Harvel et al., U.S. Pat. No. 4,904,087, granted Feb. 27, 1990, hereby incorporated by reference herein.

While the formation of cylindrical lens segments has been discussed, a rectangular grid-shaped notch pattern could be used to yield lens segments having rectangular cross-sections. The substrate 11 could be of materials other than silica, e.g., silicon, gallium arsenide, etc. While the RIE technique of the Feldblum et al. patent and the Derkits patent is most commonly used to make microlens arrays, it can also be used for making other microstructures. For example, the copending application of Haemmerle et al., Ser. No. 08/165,203, filed Dec. 23, 1993 describes how the technique can be used to make tapered optical waveguides. An array of such waveguides can be made on a single substrate that is separated using the present invention. If desired, the pattern of notches can be made after defining the microstructures to effect the separation.

The various embodiments are intended to be merely illustrative of the invention concepts involved. Various other modifications and embodiments may be made by those skilled in the art without departing from the spirit and scope of the invention.

We claim:

1. A method for making microstructures comprising the steps of: forming a plurality of first elements of a first material overlying a first surface of a substrate of a second material; at least partially melting the first elements to cause them to have curved upper surfaces; solidifying the first elements; reactive ion etching the first surface of the substrate and said plurality of first elements such that differential etching of the substrate produces microstructures in the substrate; wherein the improvement comprises:

producing a pattern of notches in a second surface of the substrate opposite the first surface;
and wherein the reactive ion etching of the first surface is sufficiently deep to cooperate with said pattern of notches to aid in separating the substrate into segments.

2. The method of claim 1 wherein:
the microstructures are microlenses;
and the depth of the notches plus the depth of reactive ion etching of the first surface substantially equals the thickness of said substrate.

3. The method of claim 2 wherein:
said pattern of notches defines an array of first areas on the second surface, each area being substantially surrounded by a notch;
the first elements are each located on an area of the first surface corresponding to a first area of the second surface;
and the reactive ion etch step separates the substrates into a plurality of segments each containing one of said microstructures.

4. The method of claim 1 wherein:
the second material is silica, and the first material is a photoresist material.

5. The method of claim 1 wherein:
the pattern of notches is made by photolithographic masking and reactive ion etching of the second surface of the substrate.

6. The method of claim 3 wherein:
said pattern of notches have the general shape of interconnected annuli;
and each of said plurality of segments has a cylindrical shape.

7. The method of claim 6 wherein:
the reactive ion etching of the first surface is sufficiently deep to reach the pattern of notches.

8. The method of claim 2 wherein:
the step of producing the pattern of notches precedes the step of producing the microlenses.

9. A method for making microlenses comprising the steps of:
producing a pattern of notches in a second surface of a substrate that lies opposite a first surface of the substrate, the pattern being of a general grid form defining an array of substrate segments;

forming first elements of a first material on the first surface of the substrate, the substrate being of a second material;

each of said first elements being located within an area of said first surface which corresponds to one of said segments;

reactive ion etching the first surface of the substrate and said plurality of first elements such that differential etching of the substrate produces lens elements in the substrate;

the reactive ion etching of said first surface being sufficiently deep to reach said pattern of notches, thereby to separate the substrate segments.

10. The method of claim 9 wherein:

each of the segments has a cylindrical shape with a central axis;

and each of said first elements has the shape of a cylinder which has an axis substantially coaxial with the axis of a segment.

11. The method of claim 9 wherein:

the second material is silica, and the first material is a photoresist material.

12. The method of claim 9 wherein:

the pattern of notches is made by photolithographic masking and reactive ion etching of the second surface of the substrate.

* * * * *